(No Model.)

6 Sheets—Sheet 1.

G. W. BAKER.
MACHINE FOR WORKING HIDES AND SKINS.

No. 497,941.

Patented May 23, 1893.

Witnesses:
Jesse Heller.
Phill. Masi.

Inventor:
Geo. W. Baker
by E. W. Anderson
his Attorney.

(No Model.)
6 Sheets—Sheet 2.
G. W. BAKER.
MACHINE FOR WORKING HIDES AND SKINS.
No. 497,941. Patented May 23, 1893.
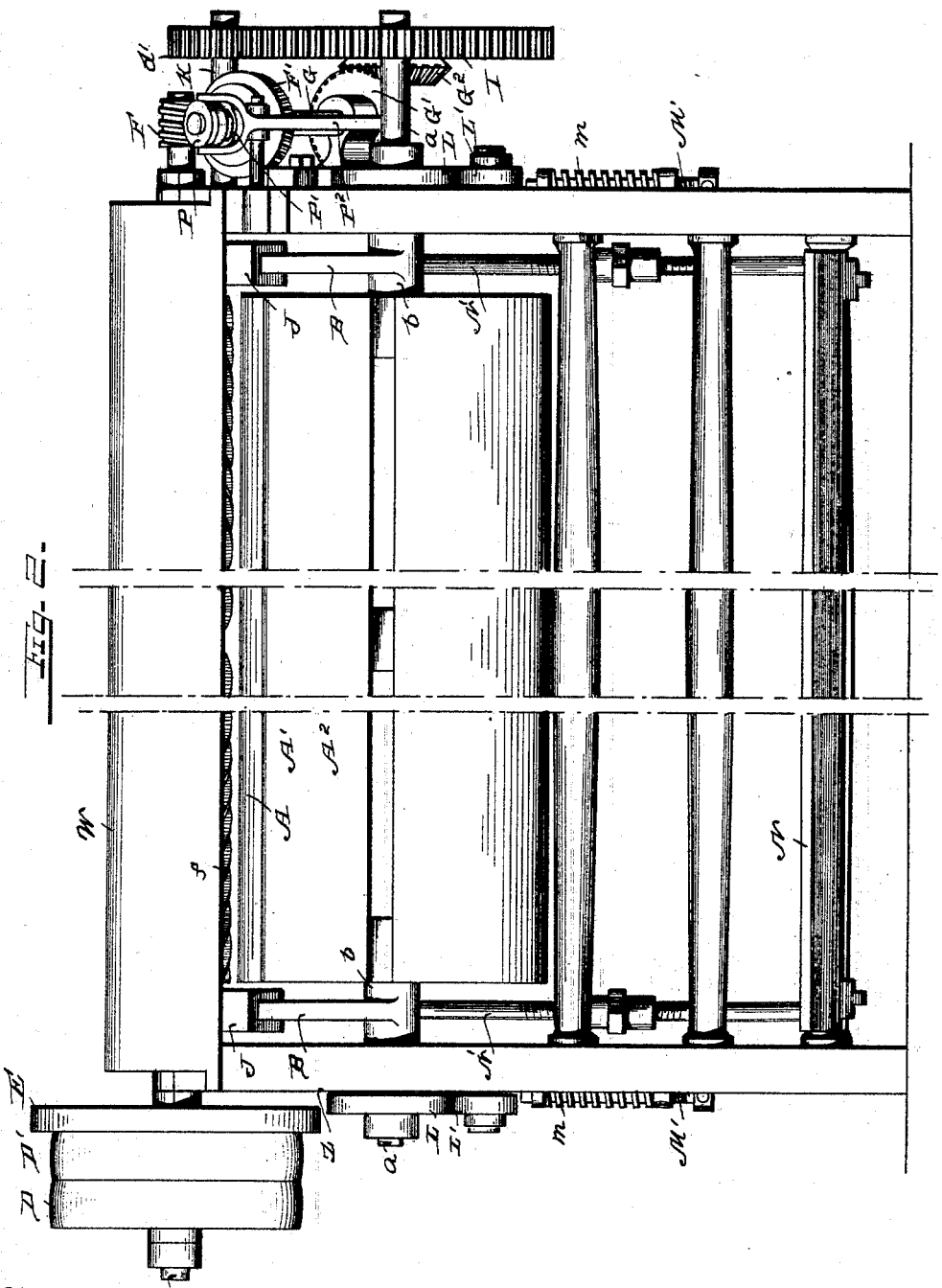
Witnesses:
Jesse Heller.
Phil. C. Masi
Inventor:
Geo. W. Baker
by E. W. Anderson
his Attorney.

(No Model.) 6 Sheets—Sheet 3.
G. W. BAKER.
MACHINE FOR WORKING HIDES AND SKINS.
No. 497,941. Patented May 23, 1893.
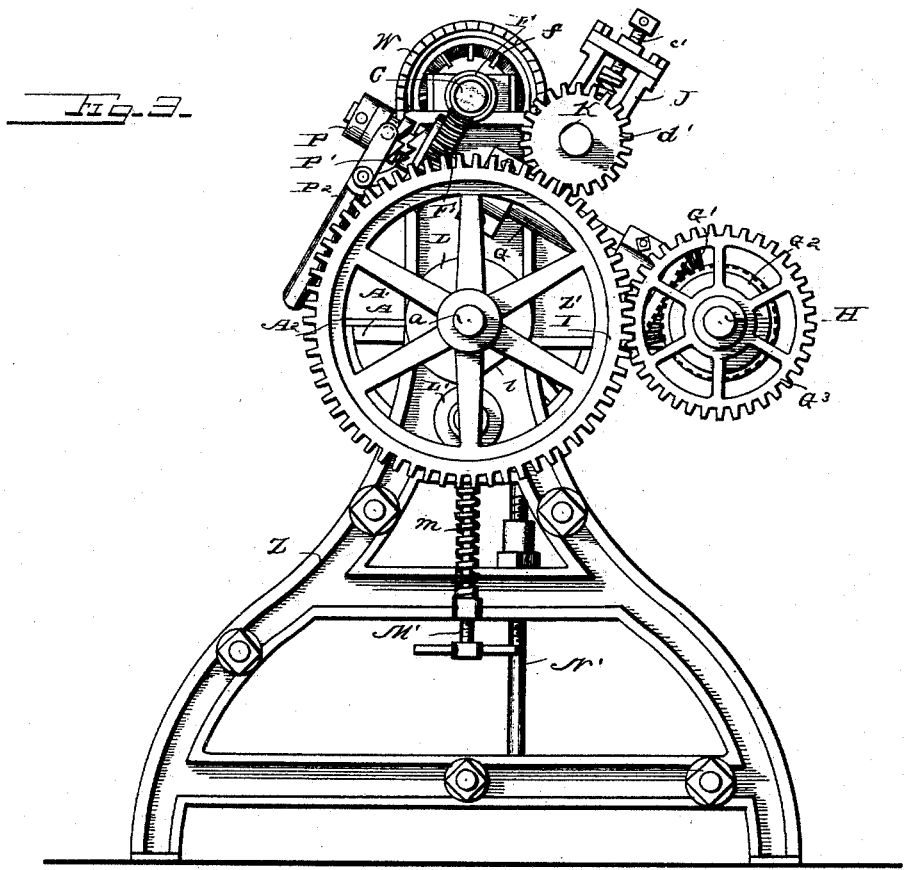
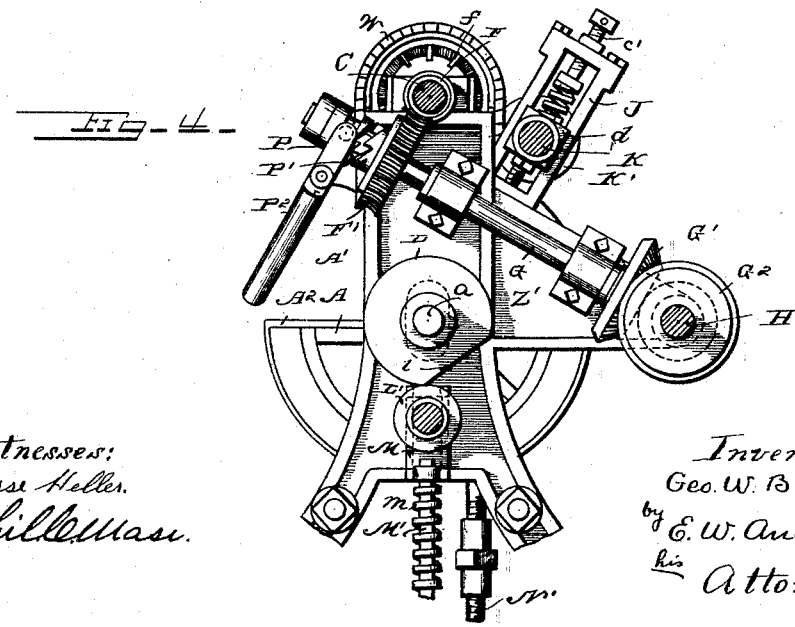
Witnesses:
Jesse Heller.
Phill C. Mass.
Inventor:
Geo. W. Baker
by E. W. Anderson
his Attorney.

(No Model.) 6 Sheets—Sheet 4.
G. W. BAKER.
MACHINE FOR WORKING HIDES AND SKINS.
No. 497,941. Patented May 23, 1893.
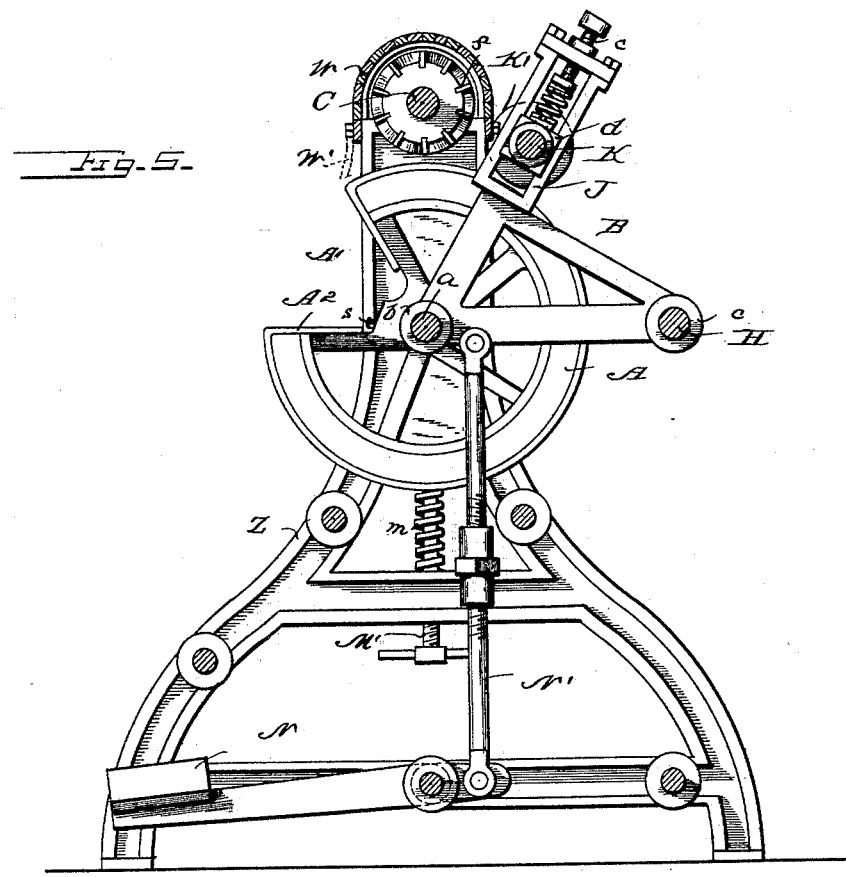
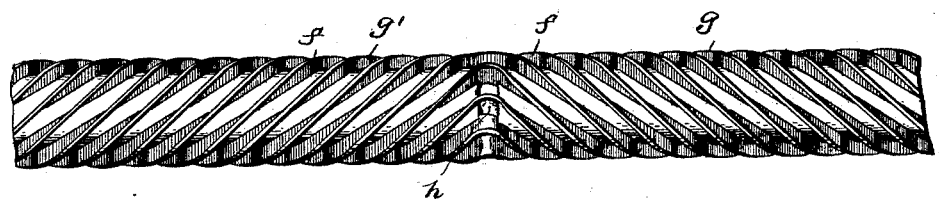
Witnesses:
Jesse Heller
Phil C. Masi
Inventor:
Geo. W. Baker
by E. W. Anderson
his Attorney (No Model.) 6 Sheets—Sheet 5.

G. W. BAKER.
MACHINE FOR WORKING HIDES AND SKINS.

No. 497,941. Patented May 23, 1893.

Witnesses:
Jesse Heller.
Phil C. Masi.

Inventor:
Geo. W. Baker,
by E. W. Anderson
his Attorney.

(No Model.) 6 Sheets—Sheet 6.
G. W. BAKER.
MACHINE FOR WORKING HIDES AND SKINS.
No. 497,941. Patented May 23, 1893.
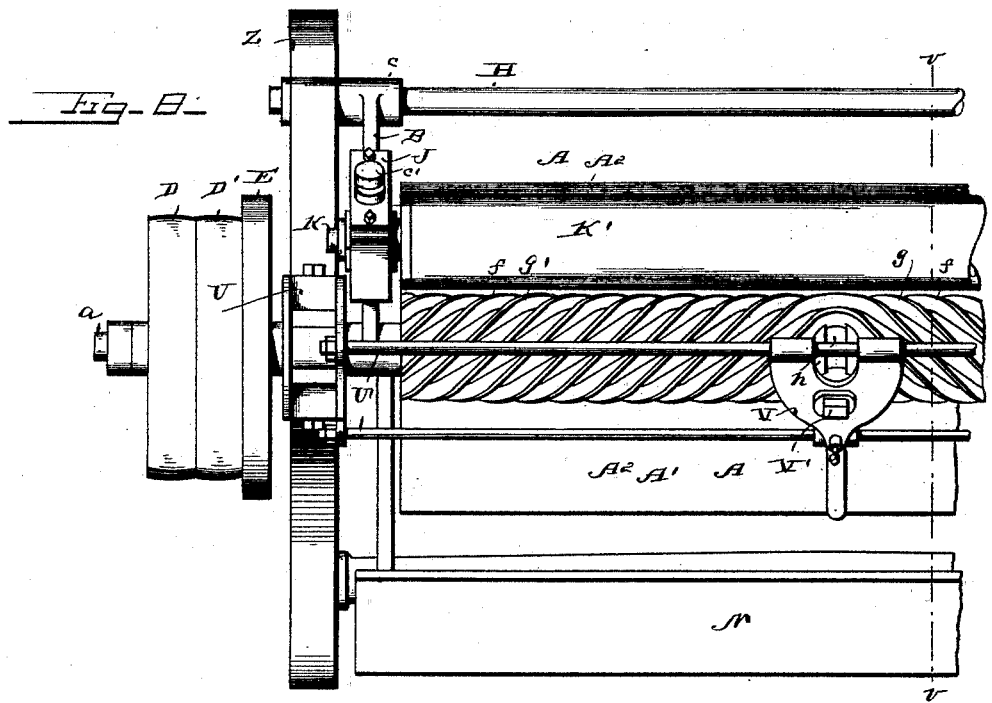
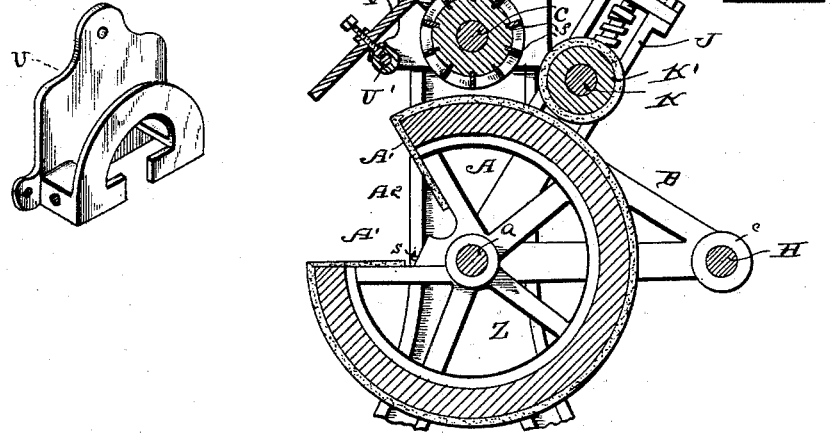
Witnesses:
Jesse Heller
Phil C. Masi
Inventor:
Geo. W. Baker,
by E. W. Anderson
his Attorney.

United States Patent Office.

GEORGE W. BAKER, OF WILMINGTON, DELAWARE.

MACHINE FOR WORKING HIDES AND SKINS.

SPECIFICATION forming part of Letters Patent No. 497,941, dated May 23, 1893.

Application filed August 16, 1892. Serial No. 443,219. (No model.)

*To all whom it may concern:*

Be it known that I, GEORGE W. BAKER, a citizen of the United States, and a resident of Wilmington, in the county of New Castle and State of Delaware, have invented certain new and useful Improvements in Machines for Working Hides and Skins; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
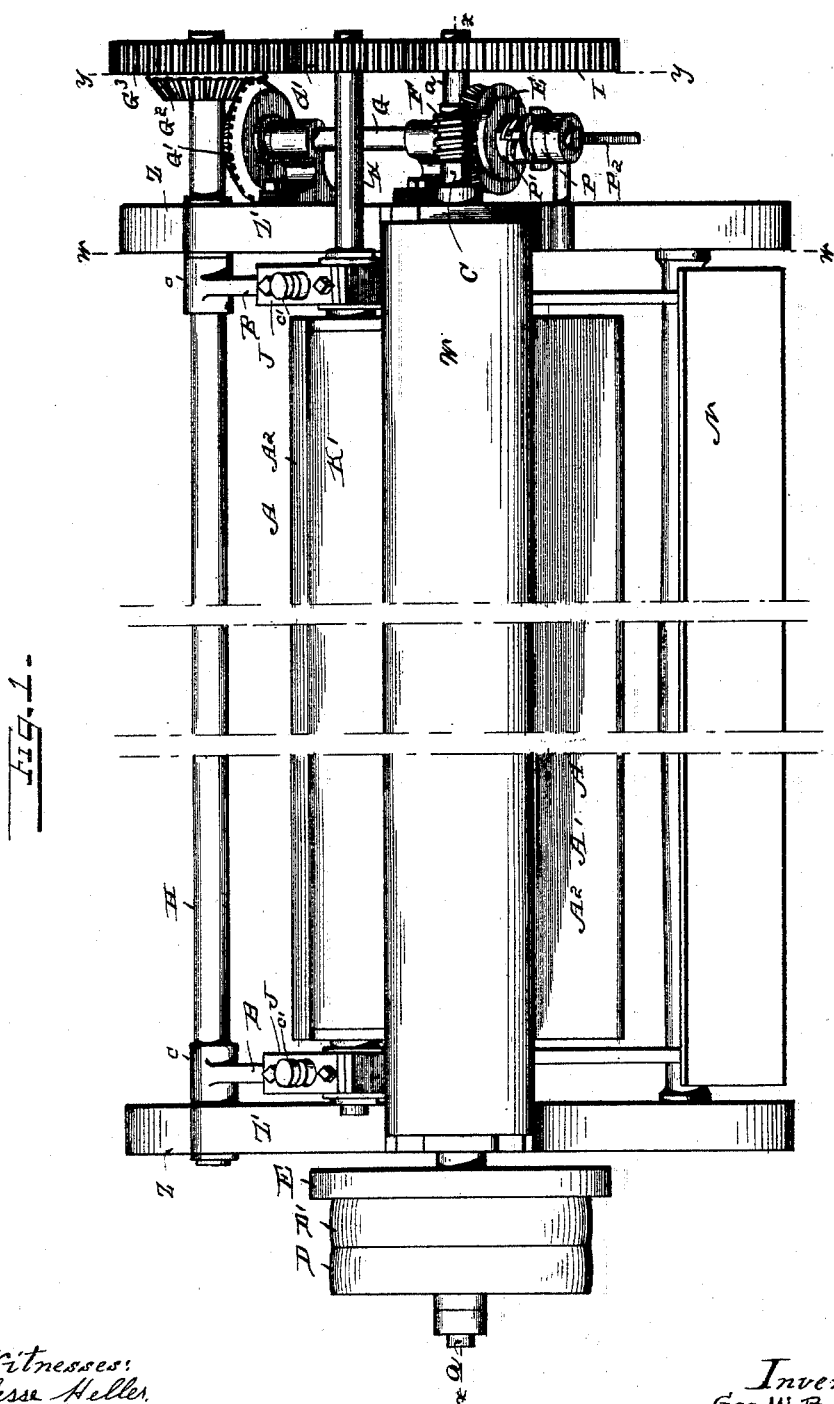
Figure 6:
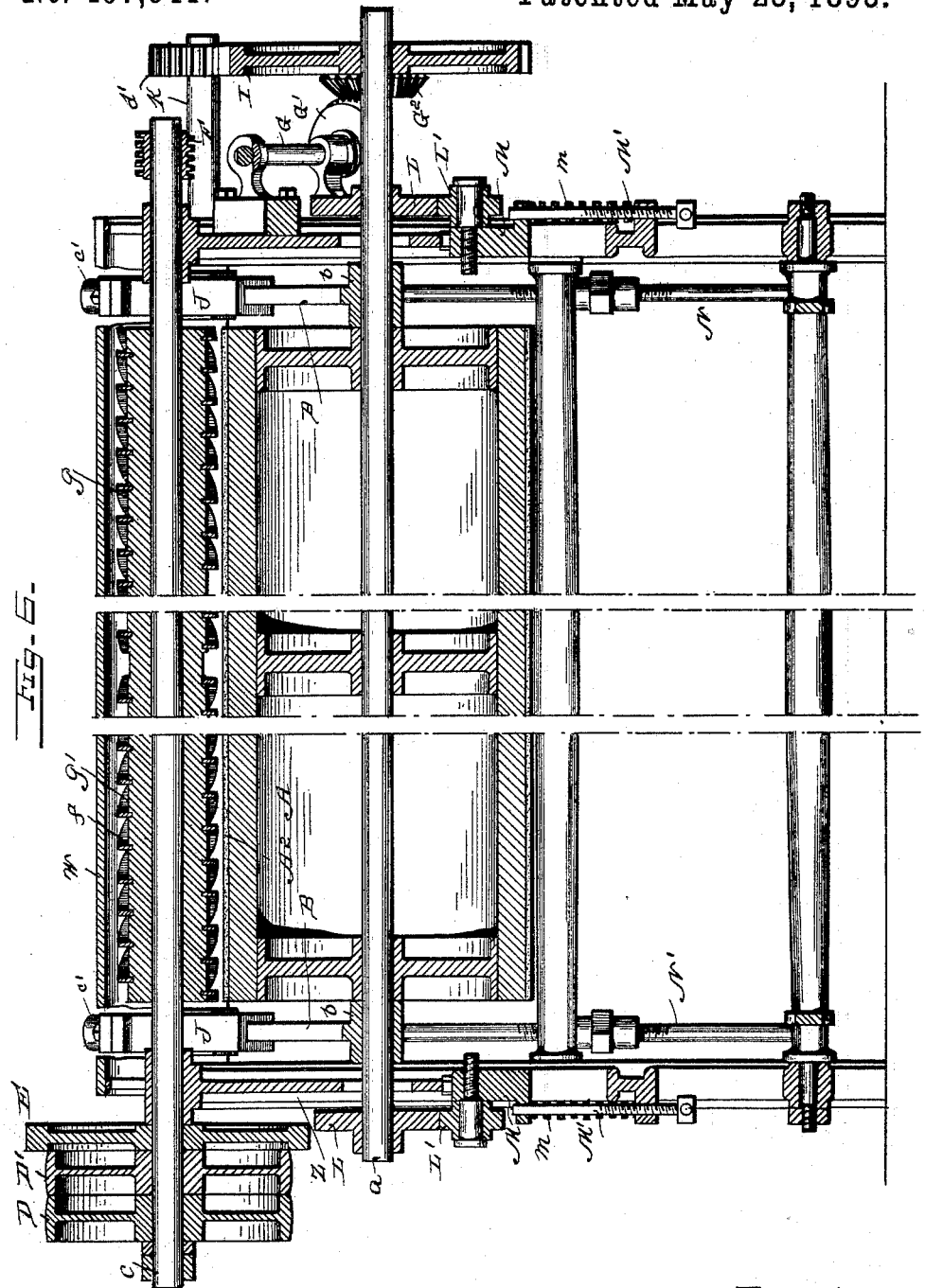

Figure 1 is a plan view of a machine embodying my invention. Fig. 2 is a side elevation of the same. Fig. 3 is an end view of the same. Fig. 4 is a vertical transverse section on the line $y-y$, Fig. 1. Fig. 5 is a vertical transverse section on the line $w-w$, Fig. 1. Fig. 6 is a longitudinal vertical section on the line $x-x$, Fig. 1. Fig. 7 is a detail view of a portion of the scraping or cutting roll. Fig. 8 is a partial front view of a machine with grinding attachment for the knives or scrapers. Fig. 9 is a vertical transverse section on the line $v-v$, Fig. 8. Fig. 10 is a detail view of a part of the grinding attachment.

This invention has relation to certain new and useful improvements in machines for working hides and skins, and it consists in the novel construction and combination of parts, all as hereinafter specified.

The invention is especially applicable to fleshing hides and skins, but may also be used for "putting out" and other treatment, and has more particularly for its object, the improvement of the method of arranging and operating the revolving cylinder which carries the hides or skins under the knives or scrapers; also the means for driving the different parts, as well as the arrangement and operation of the machine as a whole.

Referring to the accompanying drawings, illustrating the invention, the letter Z designates the supporting frame, which is of the proper form to provide bearings and supports for the various parts now to be described.

The letter A designates a drum or cylinder of the proper diameter, and supported longitudinally in the frame by its central shaft $a$ with which it is fast. Said shaft has bearings near its ends in swinging or rocking frames B, B, which will be more fully described hereinafter.

C designates the main or driving shaft which is supported in boxes in the upper portion of the frame, parallel with the drum A, and centrally thereover. On one end of this shaft are the fast and loose pulleys D, D', and balance wheel E, and on the other end is a worm F, which is arranged to mesh with and drive a worm wheel F', on the upper portion of an oblique shaft G, journaled in boxes on the frame. On the lower portion of this shaft G is a bevel toothed wheel G', which meshes with and drives a similar wheel $G^2$ on a shaft H, which is journaled back of the drum A. On said shaft H fast to the bevel wheel $G^2$ is a gear wheel $G^3$, which drives a large gear wheel I on the end of the drum shaft, thus providing for the rotation of the drum in a direction opposite to that of the main or driving shaft. Both said wheels $G^2$, and $G^3$ turn loosely on the shaft H.

The shaft H is provided with bearings in extensions Z' of the frame, and inside of these extensions at each end, is located one of the swinging or rocking frames B, hereinbefore referred to. Said frames are of triangular form, as best shown in the drawings and pivot on the shaft H, from which as a center they rock or swing. In the lower apices of the triangles are located the bearings $b$ for the drum shaft, and in the rear apices the bearing $c$ for the shaft H. The other corner of each frame has an upward extension J, in which are supported the adjustable boxes $c$ in which is journaled the shaft K, of the grip or feed roll K'. This roll or cylinder is located back of the main shaft and below it, above the periphery of the drum A, and its shaft is driven by a small gear wheel, which meshes with the gear wheel I on said drum shaft, said roll being thereby driven oppositely to the shaft C. Said shaft C, above the periphery of the drum carries a cylinder having set therein a series of spiral knives or scrapers $f$, having their direction reversed at the center of the cylinder. Near each end of the drum shaft and fast thereon is a cam L. These cams rest and travel on rollers L' which are supported in adjustable bearings M, the adjustment of which is effected by means of the screws M′ and springs m.

N is a treadle hung on the base of the machine, and connected by rods N′ with the rocking frames B. The drum A has a segment A′ removed therefrom, as indicated in the drawings, in order to facilitate the securing of the hides thereto, and to form a starting point for the knives or scrapers to commence their work. The drum also has an elastic covering $A^2$ of rubber, or other suitable material, and the feed roll K should also have a rough or fluted surface.

It will be apparent that by reason of the swinging or rocking frames, the drum will be capable of a vertical movement with its shaft, toward or away from the knives or scrapers, and that this movement will be imparted to it during its constant rotation by reason of the cams L traveling on the rollers L′ and that the distance to which it shall approach said knives or scrapers when at its highest point, is determined by the adjustment of the said rollers. Owing to this fact, by means of the screws M′ the rollers may be adjusted so as to set the machine for a hide or skin of any thickness, and herein resides an important feature of the invention. In many machines it is necessary for the operator to constantly operate the treadle, and there is difficulty in his keeping a uniform pressure on the treadle in the absence of which the hide or skin is unevenly treated. By the present arrangement, the drum is adjusted to the proper movement, and is held there, so that the treadle need only be used in case of a hide of unusual thinness. This leaves the operator free to prepare a second hide for the machine while the first is being treated thereby, and thus effects a material saving of time, as well as a uniform treatment. It is of course necessary that the hide or skin shall be caught by the feed roll or cylinder before it is acted upon by the knives or scrapers, in order that it shall not be drawn from the drum. The position of the cams on the drum shaft is therefore such that their lower portions shall travel on the rollers L′ until the hide or skin reaches the grip roll. At this time, the high portions of the cams ride upon the rollers, which at once elevates the drum, and the knives or scrapers commence to act. The worm wheel F′ is loosely sleeved on the shaft G, and the sleeve thereof is provided with a clutch section P. On the shaft is a similar section P′ operated by the clutch lever $P^2$. By this arrangement, the drum and feed roll may be thrown out of gear at will.

The boxes c may be adjusted by means of the screws c′ to within any distance of the drum, to suit the various requirements. The knives or scrapers and the feed roll are covered by a guard w, to prevent the escape of any matter from the hides while being treated. At the front, this guard may be extended, or a flexible strip W′ may be provided to shield the operator. It will be observed that the opposite direction of the spiral knives or scrapers will prevent any puckering or drawing toward the center of the hides or skins, and will also draw or stretch them.

The spiral knives from constant use, become round on their cutting edges, and in order to resharpen or bring them to the proper edge, a grinding attachment now to be described is provided. This attachment consists of two brackets U, U resting upon the main stands of the machine, and held apart by two rods or shafts U′, which also act as guides for the grinder carriage V. Said grinder carriage is made to slide from side to side above the knife cylinder, so as to operate upon the entire length of the knives. V′ is an emery block securely held in the carriage, and which does the grinding. The adjustment of this block is effected by means of the screw v.

In order that the operation may be clearly understood, the following résumé and description thereof, may be given:—The parts being in the proper position, with the lower portions of the cams on the rollers L′, the skin or hide is applied to the drum by securing one end portion to small hooks S, as seen in Figs. 5 and 9 or other suitable fastening means, within the cut-away portion A′. As soon as the drum has revolved sufficiently for the higher portions of the cams to ride upon the rollers L′, the drum is elevated, as hereinbefore described, into position for the knives or scrapers to commence their work. The elevation of the drum rocks the triangular frames B on the shaft H, and thereby also raises the grip or feed roll K′, which catches the hide or skin just previous to the commencement of the action of the knives or scrapers, so that said hide or skin shall not be drawn from the drum. By the time that portion of the hide or skin which is upon the surface of the drum has passed the knives or scrapers, the lower or flat portions of the cams have reached the rollers L′, and the drum falls. The hide or skin is then removed, and replaced end for end, in order that the portion which was within the cut-away portion of the drum during the first part of the operation, may now be treated.

Having described this invention, what I claim, and desire to secure by Letters Patent, is—

1. In a machine for treating hides or skins, the combination with the revolving drum or cylinder, and the oppositely driven knives or scrapers, of the cams fast on the drum shaft, the adjustable rollers on which said cams travel, and means for adjusting said rollers, substantially as specified.

2. In a machine for treating hides or skins, the combination with the revolving drum or cylinder, the oppositely driven knives or scrapers, and the driving gear, of the cams fast on the drum shaft, the adjustable rollers on which said cams travel, and the adjustable feed roll, moving with said drum by the operation of said cams, substantially as specified.

3. In a machine for treating hides or skins, the combination with the revolving drum or cylinder, the main driving shaft above said drum or cylinder, the series of oppositely directed spiral knives or scrapers on said shaft, and the adjustable feed roll, of the rocking or swinging frames in which the drum shaft and the feed roll shaft are journaled, the cams fast on said drum shaft, and the adjustable rolls on which said cams travel, substantially as specified.

4. In a machine for treating hides and skins, the combination with the main or driving shaft, the knife cylinder carried thereby, the revolving drum or cylinder below said knife cylinder, and the grip or feed roll to the rear of and between said knife cylinder and drum, of the worm on said main shaft, the oblique shaft having a worm wheel engaged by said worm, the shaft H having bevel gear driven from said oblique shaft, the gear wheel on said shaft H for driving said drum, and means for intermittently raising said drum and feed roll, substantially as specified.

5. In a machine for treating hides and skins, the combination with the main shaft, and its series of oppositely directed spiral knives or scrapers, of the drum having a vertical movement toward and away from said knives or scrapers, the adjustable feed roll, the swinging triangular frames in which said drum and feed roll shafts are journaled, the cams fast on the drum shaft, the adjustable rollers on which said cams travel, the adjusting devices for said rollers, the treadles connected to said swinging frames, substantially as specified.

6. The combination with the drum and feed roll, and the swinging frames carrying said drum and roll, of the cams fast on the drum shaft, and the rollers on which said cams travel, and means for adjusting said rollers, the feed roll, the knife cylinder, and gear mechanism whereby said knife cylinder is driven oppositely to said drum, and whereby the feed roll is driven oppositely to said knives, substantially as specified.

In testimony whereof I affix my signature in presence of two witnesses.

GEORGE W. BAKER.

Witnesses:
JULIUS MUELLER,
JUSTIN SCHUNTZ.